(12) United States Patent
Llopart Prieto et al.

(10) Patent No.: US 9,550,331 B2
(45) Date of Patent: Jan. 24, 2017

(54) METHOD AND DEVICE FOR PRODUCING A COMPOSITE MOLDED PART FROM FIBER-REINFORCED PLASTIC

(75) Inventors: Llorenc Llopart Prieto, Munich (DE); Rainer Neumaier, Unterschleissheim (DE); Jochen Scholler, Grossaitingen (DE); Markus Klug, Dachau (DE)

(73) Assignees: PREMIUM AEROTEC GMBH, Ottobrunn (DE); EADS DEUTSCHLAND GMBH, Augsburg (DE)

( * ) Notice: Subject to any disclaimer, the term of this patent is extended or adjusted under 35 U.S.C. 154(b) by 929 days.

(21) Appl. No.: 13/640,324

(22) PCT Filed: Apr. 7, 2011

(86) PCT No.: PCT/DE2011/000379
§ 371 (c)(1),
(2), (4) Date: Dec. 19, 2012

(87) PCT Pub. No.: WO2011/124216
PCT Pub. Date: Oct. 13, 2011

(65) Prior Publication Data
US 2013/0099427 A1  Apr. 25, 2013

(30) Foreign Application Priority Data
Apr. 10, 2010 (DE) .................. 10 2010 014 545

(51) Int. Cl.
*B29C 70/44* (2006.01)
(52) U.S. Cl.
CPC ..................... *B29C 70/44* (2013.01)
(58) Field of Classification Search
CPC ..................................................... B29C 70/44
(Continued)

(56) References Cited

U.S. PATENT DOCUMENTS 4,942,013 A * 7/1990 Palmer ................ B29C 43/3642
156/285
5,236,646 A  8/1993 Cochran et al.
(Continued)

FOREIGN PATENT DOCUMENTS

DE  102008006261 B3  1/2009
DE  102008015070 B3  10/2009
(Continued)

OTHER PUBLICATIONS

European Patent Office, International Search Report in International Patent Application No. PCT/DE2011/000379 (Aug. 3, 2011).

*Primary Examiner* — Robert J Grun
(74) *Attorney, Agent, or Firm* — Leydig, Voit & Mayer, Ltd.

(57) ABSTRACT

A method for producing a composite molded part from fiber-reinforced plastics material includes providing a prepreg semi-finished product including fibers that are pre-impregnated with a matrix material and encasing the semi-finished product with a flexible sheet material to form an inner arrangement. The flexible sheet material includes a gas-permeable membrane and an inner planar gas-conducting element. The inner arrangement is encased with a first gas-tight casing and positioned on a molding surface of a mold. The inner arrangement and molding surface is encased with a second gas-tight casing. A first negative pressure is applied to the inner planar gas-conducting element and the inside of the first gas-tight casing, and the entire arrangement is heated for a first time at a first temperature. A second negative pressure is applied to an inside of the second gas-tight casing and the entire arrangement is heated for a second time at a second temperature.

10 Claims, 1 Drawing Sheet

(58) Field of Classification Search
USPC .................................. 264/316, 571; 425/388
See application file for complete search history.

(56) References Cited

U.S. PATENT DOCUMENTS

| | | | |
|---|---|---|---|
| 2002/0020934 A1* | 2/2002 | Hinz ..................... | B29C 70/443 |
| | | | 264/40.6 |
| 2003/0011094 A1* | 1/2003 | Filsinger ............... | B29C 70/086 |
| | | | 264/102 |
| 2008/0308210 A1 | 12/2008 | Keller et al. | |
| 2010/0297399 A1* | 11/2010 | Utecht ................ | B29C 43/3642 |
| | | | 428/160 |

FOREIGN PATENT DOCUMENTS

| | | |
|---|---|---|
| EP | 1393883 A1 | 3/2004 |
| WO | WO 2005113213 A2 | 12/2005 |

\* cited by examiner

METHOD AND DEVICE FOR PRODUCING A COMPOSITE MOLDED PART FROM FIBER-REINFORCED PLASTIC

CROSS REFERENCE TO RELATED APPLICATIONS

This application is a U.S. National Phase application under 35 U.S.C. §371 of International Application No. PCT/DE2011/000379, filed on Apr. 7, 2011, and claims benefit to German Patent Application No. DE 10 2010 014 545.9, filed on Apr. 10, 2010. The International Application was published in German on Oct. 13, 2011, as WO 2011/124216 A1 under PCT Article 21 (2).

FIELD

The present invention relates to a method and a device for producing a composite moulded part from fibre-reinforced plastics material. The method according to the invention and the device according to the invention can be applied in particular in the production of lightweight structures by means of fibre-reinforced plastics material, in particular by means of carbon-fibre-reinforced plastics material and corresponding composite materials.

BACKGROUND

What are known as prepreg systems are conventionally produced in an autoclave, from fibres which have been pre-impregnated with a matrix material, the matrix material of a formed prepreg semi-finished product undergoing a curing process under the influence of negative pressure and temperature. However, this method is not suitable for carrying out in situ repairs, for example on aircraft, since it is obviously not possible to accommodate the entire aircraft in an autoclave. Repairs of this type therefore have to be carried out by a different method outside an autoclave. Processes of this type, known as "out-of-autoclave" processes, are known in the art. However, the mechanical properties and in particular the strength of composite moulded parts of this type, which are produced outside an autoclave, are considerably worse than for moulded parts which have been cured in an autoclave.

From the scientific publication "Out-of-autoclave processable prepregs and resin films: An overview of recent developments and shared database", Ridgard C., SAE technical paper series, No. 2006-01-3164, it is known to cure composite components of prepreg material in negative pressure heating bags, for example so as to produce prototypes. The strength of composite components which are produced in this manner does not correspond to the strength of components which are baked in an autoclave, but is often sufficient for prototype construction. Meanwhile, it is possible to produce prepreg materials which are close, in terms of fibre density and porosity, to prepreg materials which are cured in an autoclave, but the mechanical properties thereof are worse than for prepreg materials which are cured in the furnace, in particular when loaded with pressure or impacts, since for example a different plastics material is used as the matrix material.

A drawback of what are known as out-of-autoclave prepreg systems is that they have to have a low-viscosity matrix material so as to achieve a low porosity and a high fibre content by volume. This has the result that the mechanical strength of the products produced therefrom is lower than for products which are cured in an autoclave, in such a way that the out-of-autoclave process is not suitable for repair purposes in which a high mechanical loading capacity has to be achieved.

In parallel with the development of out-of-autoclave prepregs, novel methods for introducing matrix material into dry fibre material have also been developed. One of these novel methods is what is known as the "vacuum-assisted process" (VAP), which is known for example from the literature source "Principles of the vacuum assisted process and its application for aerospace components", Körwien T., ISCM 06 ("3rd International Symposium on Composites Manufacturing Technology for Aircraft Structures", 17 to 18 May 2006). In this method of the vacuum-assisted process, a dry fibre material is covered with a gas-permeable microporous membrane, which forms a barrier for the matrix material consisting of synthetic resin. As a result of applying a negative pressure, the matrix material is sucked out from a storage container into the dry fibre material. A special variant of the VAP method is disclosed in EP 1 393 883 A1, in which the aeration space, between the membrane and the outer vacuum sack, and the injection space, between the component to be produced and the membrane, can each be evacuated separately.

Another improvement on the curing process for prepregs is what is known as the double vacuum bag (DVB) method, which is described for example in WO 2005/113213 A2 or the literature "NASA LAR-16877, Double-vacuum-bag process for making resin-matrix composites". In this method, a composite moulded part blank, of a prepreg material consisting of fibres which are pre-impregnated with a matrix material, is laid between two metal moulding plates, and this arrangement is subsequently enclosed in a vacuum bag, which forms an inner bag which is fixed in a sealed manner on one of the moulding plates. The inside of this inner bag is connected to a vacuum pump. A tool in the form of an inverted perforated beaker is placed above this arrangement. Outside this bag, a further vacuum bag is placed around the entire arrangement as an outer vacuum bag. The inside of this outer vacuum bag is also attached to a vacuum pump. This entire arrangement is subsequently placed in a hot air furnace and subjected to a predetermined curing process. In this context, a negative pressure is initially applied to the outer bag, in such a way that it lies against the outside of the beaker-shaped structure, resulting in a negative pressure in the remaining space outside the inner bag. Subsequently, a smaller negative pressure is applied to the inside of the inner bag. In this context, the stronger negative pressure surrounding the inner bag prevents the inner bag from collapsing onto the moulded part which is to be cured. The negative pressure which is present in the inside of the inner bag ensures that gases which are produced during the curing process escape from the prepreg material, and are not included in the material as gas bubbles during the curing. After a predetermined period, the inside of the outer bag is exposed to the ambient pressure again, and as a result, the inner bag collapses onto the moulded part and mechanically compresses it. This is followed by a further curing process for a predetermined time at a higher temperature. A drawback of this method is the complicated construction resulting from the beaker-shaped support structure for the outer vacuum bag.

The double vacuum bag method DVB does not achieve the high mechanical strength which is exhibited by prepregs which have been cured in an autoclave.

DE 10 2008 006 261 B3 discloses a multilayer, flexible sheet material which comprises a gas-permeable membrane and a textile layer, which is laminated onto said membrane and forms a gas-conducting structure. A gas-impermeable layer may additionally be applied on the side of the textile layer remote from the membrane.

DE 10 2008 015 070 B3 discloses a method for producing fibre composite components, which is specifically designed for application in an autoclave. For this purpose, there is an inner component space inside an outer vacuum space, the two spaces being interconnected in such a way that they can be evacuated together. As the external pressure is increased during the curing phase of the component, the connection between the two spaces closes automatically, in such a way that no infusion resin can escape from the component space.

SUMMARY

In an embodiment, the present invention provides a method for producing a composite molded part from fiber-reinforced plastics material that includes providing a prepreg semi-finished product including fibers that are pre-impregnated with a matrix material and encasing the semi-finished product with a flexible sheet material to form an inner arrangement. The flexible sheet material includes a gas-permeable membrane and an inner planar gas-conducting element. The inner arrangement is encased with a first gas-tight casing and positioned on a molding surface of a mold. The inner arrangement and molding surface is encased with a second gas-tight casing. A first negative pressure is applied to the inner planar gas-conducting element and the inside of the first gas-tight casing, and the entire arrangement is heated for a first time at a first temperature. A second negative pressure is applied to an inside of the second gas-tight casing and the entire arrangement is heated for a second time at a second temperature.

BRIEF DESCRIPTION OF THE DRAWINGS

Exemplary embodiments of the present invention are described in more detail below with reference to the drawings, in which.

DETAILED DESCRIPTION

Figure 1:
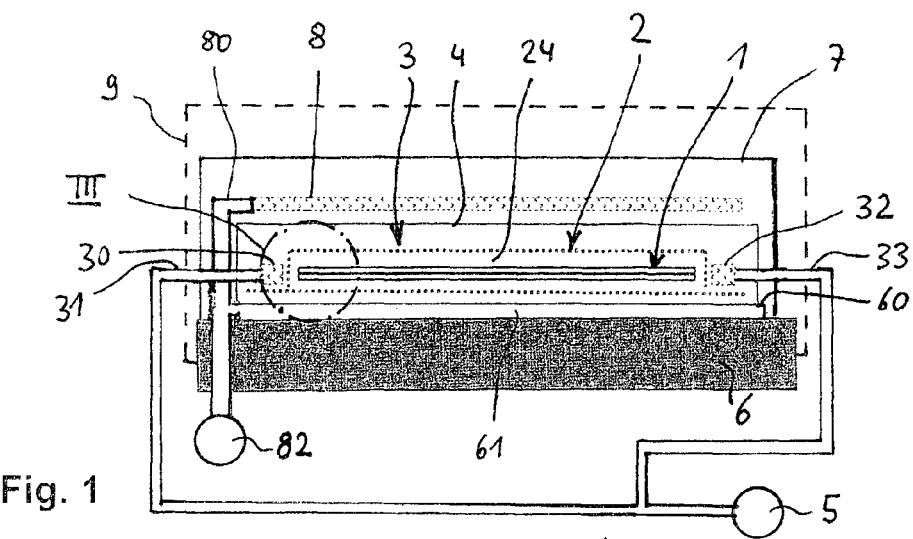
FIG. 1 is a schematic cross-sectional drawing of a first embodiment of the device according to the invention.

An aspect of the present invention is to provide a method and a device for producing a composite moulded part from fibre-reinforced plastics material, which method and device are also suitable for repairing composite moulded parts which have been cured in an autoclave.

This method according to embodiments of the invention comprises the following steps:

a) providing a prepreg semi-finished product consisting of fibres which are pre-impregnated with a matrix material;
b) encasing the prepreg semi-finished product with a flexible sheet material, which comprises a membrane, which is gas-permeable but holds back the matrix material, and at least one inner planar gas-conducting means;
c) encasing the inner arrangement, which is formed by the prepreg semi-finished product and the sheet material, with a first gas-tight casing;
d) positioning the inner arrangement, which is provided with the first gas-tight casing, on a moulding surface of a first mould;
e) encasing the inner arrangement, which is provided with the first gas-tight casing, and the moulding surface with a second gas-tight casing;
f) applying a first negative pressure to the inner planar gas-conducting means and the inside of the first gas-tight casing;
g) heating the entire arrangement for a first predetermined time under the effect of a first specified temperature;
h) applying a second negative pressure to the inside of the second gas-tight casing; and
i) heating the entire arrangement for a second predetermined time under the effect of a second specified temperature.

As a result of this method, a high-quality composite moulded part having low porosity and a high fibre content by volume is obtained.

As a result of using an inner planar gas-conducting means on the membrane which encases the prepreg semi-finished product, reliable emission of vapours which occur in the prepreg semi-finished product during the curing process is ensured in steps f) and g). The subsequent application of the second negative pressure to the inside of the second gas-tight casing in step h), together with the heating of the entire device in step i), ensures that a high fibre content by volume and a low porosity are obtained in the composite moulded part.

Further, the processing time and the process temperatures can be reduced. The risk of producing defects during a repair process is also greatly reduced with the method according to the invention. A high pressure is not required for the curing process, and the mechanical properties which are obtained are comparable with those which are achieved by curing in an autoclave. As a result, lower energy consumption and lower tool costs are also achieved as a result of the lower processing pressures.

The method according to embodiments of the invention is therefore suitable in particular for in situ repairs.

In a preferred development of the method according to the invention, the following method step is carried out after step b):

b') arranging at least one gas-conducting structure on the outside, preferably on the lateral edges, of at least one surface region of the membrane.

Providing an inner gas-conducting structure on the outside of at least one surface region of the inner gas-conducting device in this manner ensures that the gases which escape from the prepreg semi-finished product through the gas-conducting means can escape rapidly and uniformly as a result of the vacuum which is applied to the gas-conducting structure. In this context, it should be noted in particular that air which is included in prepregs is generally predominantly located between the individual layers. As a result of the arrangement of the gas-conducting structures on the rims or edges of the prepreg semi-finished product, extraction by suction is provided, and ensures that the included air can be sucked out horizontally between the individual prepreg layers and via the rims or edges of the prepreg semi-finished product. In addition to this extraction by suction in the horizontal direction, volatile components are also extracted by suction through the plane of the membrane (that is to say in a vertical direction).

In another preferred embodiment of the method according to the invention, the following step is carried out after step d):

d') arranging at least one second gas-conducting structure on the outside of at least one surface region of the first gas-tight casing.

Arranging at least one outer planar gas-conducting element on the outside of at least one surface region of the first gas-tight casing ensures that, when the second negative pressure is applied in step h), the inside of the second gas-tight casing can be evacuated uniformly, leading to uniform compression of the prepreg semi-finished product.

It is also preferable, before step c), to arrange a moulding surface of a second moulding tool on the side of the inner device remote from the first moulding tool. The moulding surface of this second moulding tool, together with the moulding surface of the first moulding tool, ensures that, during the compression of the prepreg semi-finished product in step h), the prepreg semi-finished product which is arranged between the two moulding surfaces takes on the shape which is predetermined by the moulding surfaces.

It is particularly advantageous if steps b) and c) are combined by using a sheet material which is already provided with a gas-tight casing. This greatly increases the processing speed.

This device according to the invention is provided with a first moulding tool comprising a moulding surface, with an inner arrangement of a prepreg semi-finished product, consisting of fibres which are pre-impregnated with a matrix material, which can be placed on the moulding surface, and with a sheet material which encases the prepreg semi-finished product and which comprises a membrane, which is gas-permeable but holds back the matrix material, and at least one inner planar gas-conducting means, the inner arrangement being enclosed by a first gas-tight casing; with a first negative pressure source which is operatively connected to the inside of the first casing; with a second gas-tight casing which encloses the inner arrangement which is provided with the first gas-tight casing; with a second negative pressure source which is operatively connected to the inside of the second casing; and with a heating means which encloses the entire arrangement at least in part.

The construction of this device according to the invention is significantly more compact and simpler than for the DVB method known in the art, since it is not necessary to provide a beaker-shaped support body. As a result, from the arrangement according to the invention, and thus also by the method according to the invention, it is possible to produce composite moulded parts of virtually any desired shape and size, at a quality which could not previously be achieved outside an autoclave.

The first negative pressure source and the second negative pressure source may also be formed by a single negative pressure source, for example a vacuum pump, if a corresponding switchover valve is provided in the negative pressure connecting lines and selectively connects the inside of the first gas-tight casing and/or the inside of the second gas-tight casing to the negative pressure source.

In a preferred development of the device, at least one inner gas-conducting structure, which is in a fluid connection with the inner planar gas-conducting means and with the first negative pressure source, is provided on the outside, preferably on the lateral edges, of at least one surface region of the inner planar gas-conducting means.

A further preferred embodiment of the device is characterised in that at least one outer planar gas-conducting element, which is in fluid connection with the second negative pressure source, is provided on the outside of at least one surface region of the first gas-tight casing.

In another preferred embodiment of the device according to the invention, a moulding surface of a second moulding tool is arranged on the side of the inner arrangement remote from the first moulding tool. As a result, the above-described three-dimensional shaping of the composite moulded part is achieved.

It is also advantageous if the sheet material is connected, on the outside thereof remote from the membrane, to a gas-tight casing. By means of this sheet material, which is known per se in the art, the process can be made much faster.

Preferred embodiments of the invention having additional configuration details and further advantages are described and explained in greater detail in the following, with reference to the appended drawings.

Figure 3:
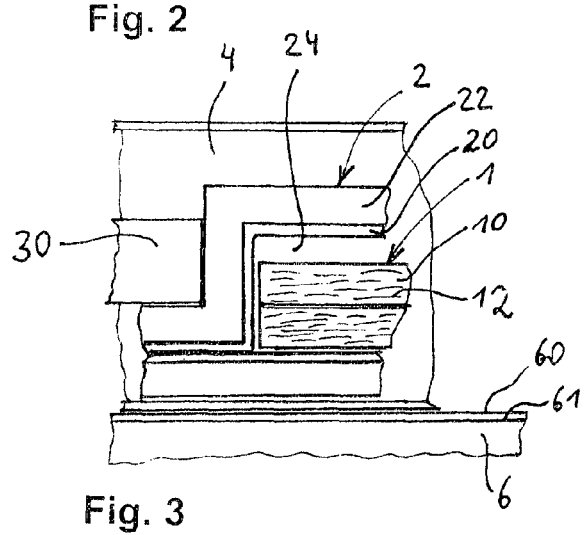
FIG. 3 is an enlarged view of the detail III from FIG. 1.

FIG. 1 and the detail in FIG. 3 show a first embodiment of the device according to the invention for producing a composite moulded part from fibre-reinforced plastics material. A prepreg semi-finished product 1 consists of fibres 12, which are pre-impregnated with a matrix material 10. In this context, the fibres 12 may form a woven material, a meshwork or any desired scrim. The prepreg semi-finished product 1 is encased with a flexible surface material 2, which comprises a membrane 20, which is gas-permeable but holds back the matrix material, and at least one inner planar gas-conducting means 22, as can be seen in the enlarged drawing of FIG. 3. The membrane 20 faces towards the prepreg semi-finished product 1 and makes it possible for gases to escape from the inner space 24, which is encased by the membrane 20, into the gas-conducting means 22, without the matrix material 10 itself entering the gas-conducting means 22 and blocking the gas-conducting ducts which are provided therein and via which the absorbed gas can flow through the sheet material. The prepreg semi-finished product 1 and the sheet material 2 which encloses it are part of an inner arrangement 3.

On opposite sides of the prepreg semi-finished product 1, which is encased by the sheet material 2, in each case a lateral gas-conducting structure 30, 32 is provided outside the sheet material 2, said structure consisting of a rod-shaped body of open-pore material which extends in the longitudinal direction of the prepreg semi-finished product 1, that is to say perpendicular to the plane of the drawing in FIG. 1, and is in contact over the length thereof with the gas-conducting means 22 of the sheet material 2, in such a way that gas which is transported in the gas-conducting means 22 of the sheet material 2 can enter the respective gas-conducting structure 30, 32. The lateral gas-conducting structures 30, 32 may for example consist of a three-dimensional knitted fabric.

The inner arrangement 3 of the prepreg semi-finished product 1, the sheet material 2 and the two gas-conducting structures 30, 32 is enclosed by a first gas-tight casing 4 which is closed per se. This gas-tight casing is flexible and is preferably in the form of a sealable bag.

In each case a negative pressure line 31, 33, which is connected to the first inner gas-conducting structure 30 or the second inner gas-conducting structure 32 respectively, is passed through the gas-tight casing 4 in a sealed manner and connected to a first negative pressure source 5.

The entire inner arrangement 3, which is provided with the first gas-tight casing 4, is positioned on a moulding surface 60 of a first moulding tool 6. The moulding surface 60 is shaped as a negative form of the composite moulded part which is to be formed, and also comprises a gas-conducting structure 61, which prevents gas cushions from being able to form between the first gas-tight casing 4 and the moulding surface 60.

A second gas-tight casing 7 encloses the arrangement 3, which is provided with the first gas-tight casing 4, and the moulding surface 60, and is attached in a sealing manner to the first moulding tool 6. Alternatively, the second gas-tight casing 7 may also additionally enclose the entire first moulding tool 6.

An outer planar gas-conducting element 8 is attached to the side, remote from the first moulding tool 6, of the gas-tight casing 4 which encloses the inner arrangement 3, and extends substantially over the entire width and length at least of the prepreg semi-finished product 1. This outer planar gas-conducting element 8 is connected to a second negative pressure source 82 via a negative pressure line 80, which is passed out of the second gas-tight casing 7 in a sealing manner.

The entire arrangement shown in FIG. 1 may be placed in a heating furnace or be enclosed by or covered with suitable heating covers. The furnace or the heating covers thus form a heating means 9, merely shown schematically in FIG. 1.

Figure 2:
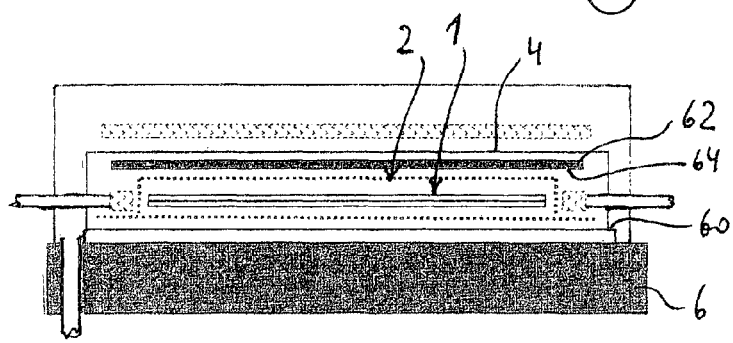
FIG. 2 is a schematic cross-sectional drawing of a second embodiment of the device according to the invention.

The device which is shown in FIG. 2 corresponds in principle to the device which is shown in FIG. 1, in such a way that the description of FIG. 1 also applies to the device of FIG. 2. Unlike in the drawing of FIG. 1, in the embodiment of FIG. 2 a second moulding tool 62 is provided, and is arranged in the inside of the first gas-tight casing 4, on the side, remote from the first moulding tool 6, of the prepreg semi-finished product 1 which is encased with the sheet material 2. The second moulding tool 62 comprises a moulding surface 64, which is matched to the moulding surface 60 of the first moulding tool 6 and which defines a negative form of the other side of the composite moulded part which is to be manufactured.

Figure 4:
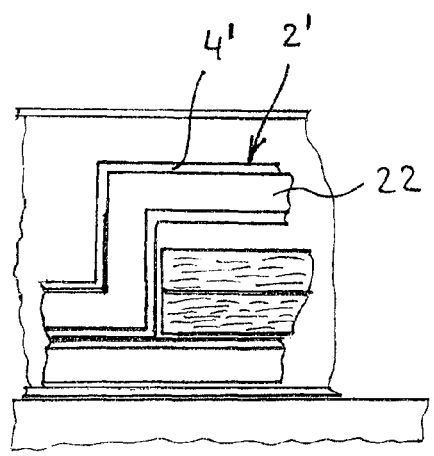
FIG. 4 is an enlarged view of the detail III in a modified embodiment.

FIG. 4 shows an alternative embodiment of the sheet material 2', which basically corresponds to the construction described in connection with FIG. 3, but which is already provided on the outside with a gas-tight casing 4'. In this arrangement, the negative pressure which is applied by the first negative pressure source 5 is applied directly to the inner planar gas-conducting means 22.

In the following, the procedure in the method according to the invention for producing a composite moulded part from fibre-reinforced plastics material is described in greater detail with reference to the drawing of FIG. 1.

Initially, the prepreg semi-finished product 1, which consists of two plates positioned on top of one another in the examples shown in the drawings but may also consist of one or more plates, is encased with the flexible sheet material 2, which is formed for example as a sealable bag. In this context, the membrane 20 of the sheet material 2 is facing towards the prepreg semi-finished product 1. This inner arrangement 3 of the prepreg semi-finished product 1 and the sheet material 2 is then initially placed temporarily on the moulding surface 60 of the first moulding tool 6. Subsequently, the inner planar gas-conducting means 22 of the flexible sheet material 2, which consists for example of a woven material, is placed in a fluid connection with the first negative pressure source 5, directly (FIG. 4) or indirectly via the inner lateral gas-conducting structures 30, 32 (FIGS. 1 to 3).

Subsequently, a second moulding tool 62 may also (embodiment of FIG. 2) be placed on the side, remote from the first moulding tool 6, of the inner arrangement 3 of the prepreg semi-finished product 1 and the sheet material 2.

The inner arrangement 3 of the prepreg semi-finished product 1, the sheet material 2, optionally the second moulding tool 62 and optionally the lateral inner gas-conducting structures 30, 32 is subsequently enclosed with the first gas-tight casing 4 in a sealing manner. Only the negative pressure lines 31 and 33 pass out of the first gas-tight casing 4.

At this point, the inner arrangement 3 which is provided with the first gas-tight casing 4 is finally placed on the moulding surface 60 of the first moulding tool 6.

The outer planar gas-conducting element 8 is now positioned on the side, remote from the first moulding tool 6, of the inner gas-tight casing 4, and subsequently the entire arrangement is enclosed with a further gas-tight casing, namely the second gas-tight casing 7, which also additionally encloses the first moulding tool 6 at least in part.

The outer planar gas-conducting element 8 and the gas-conducting structure 61 in the moulding surface 60 of the first moulding tool 6 are connected to the second negative pressure source 82 by means of the negative pressure line 80.

At this point, with the construction created in this manner, the following method steps are carried out:

$1^{st}$ Phase

Initially, the first negative pressure source 5 applies a first negative pressure to the inner planar gas conducting means 22 and to the inside of the first gas-tight casing 4. At the same time, the entire arrangement is heated to a first predetermined temperature (a typical temperature is 60° C., for example) by the heating means 9. In this context, the negative pressure in the inside of the first gas-tight casing 4 is maintained. In this first phase, the included air is sucked out at the edges of the construction.

2nd Phase

Subsequently, the second negative pressure source 82 applies a second negative pressure, which is greater than the first negative pressure, to the inside of the second gas-tight casing 7. The first predetermined temperature is maintained in this second phase. Subsequently, the negative pressure which is present in the inside of the first gas-tight casing 4 can be further reduced. The first predetermined temperature continues to be maintained in this 2nd phase. The feature of this phase is first that the matrix system has reached the minimum viscosity thereof and second that the first casing 4 no longer compresses the layer construction, since it is attracted by the second casing 7. This ensures that the included air can be sucked out horizontally between the individual prepreg layers and via the edges of the prepreg semi-finished product. In addition, volatile components are also sucked out through the plane of the membrane.

3rd Phase

Subsequently, the first negative pressure source 5 increases the vacuum in the inside of the first gas-tight casing 4. The inside of the second casing 7 is decoupled from the second negative pressure source 82 and exposed to the ambient pressure. In this phase, the entire arrangement is brought to and kept at a second predetermined temperature by the heating means 9, the second predetermined temperature being higher than the first predetermined temperature. In this way, in this phase the prepreg semi-finished product 1 is compressed by the negative pressure acting on the prepreg semi-finished product and cures under the effect of the second predetermined temperature. Since the prepreg semi-finished product 1 is pressed against the moulding surface 60 of the first moulding tool 6 by the collapsing second gas-tight casing 7 during this fourth method step, said semi-finished product takes on the shape of the moulding surface 60.

If, as in the case of FIG. 2, the second moulding tool 62 is also provided, this second moulding tool 62 is pressed against the prepreg semi-finished product 1 by the collapsing second gas-tight casing 7, in such a way that the prepreg semi-finished product 1 and the flexible sheet material 2 which encloses it are forced between the two moulding surfaces 60 and 64. In this way, in the third method step the prepreg semi-finished product takes on the shape which is defined by the two moulding surfaces 60, 64, and it retains this shape after curing, that is to say after the third phase is complete.

Reference numerals in the claims, the description and the drawings are merely intended to promote a better understanding of the invention, and not to limit the scope of protection.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS

1 prepreg semi-finished product
2 sheet material
3 inner arrangement
4; 4' first gas-tight casing
5 first negative pressure source
6 first moulding tool
7 second gas-tight casing
8 outer planar gas-conducting element
9 heating means
10 matrix material
12 fibres
20 membrane
22 inner planar gas-conducting means
24 inner space
30, 32 inner lateral gas-conducting structure
31 negative pressure line
33 negative pressure line
60 moulding surface
61 gas-conducting structure
62 second moulding tool
64 moulding surface
80 negative pressure line
82 second negative pressure source

The invention claimed is:

1. A method for producing a composite molded part from fiber-reinforced plastics material, the method comprising:
   a) providing a prepreg semi-finished product including fibers that are pre-impregnated with a matrix material;
   b) encasing the prepreg semi-finished product with a flexible sheet material so as to form an inner arrangement, the flexible sheet material including at least one inner planar gas-conducting element and a gas-permeable membrane configured to hold back the matrix material, the gas-permeable membrane being disposed between the at least one inner planar gas-conducting element and the prepreg semi-finished product;
   c) encasing the inner arrangement formed by the prepreg semi-finished product and the flexible sheet material with a first gas-tight casing;
   d) positioning the inner arrangement provided with the first gas-tight casing on a first molding surface;
   d') arranging at least one outer planar gas-conducting element on an outside of at least one surface region of the first gas-tight casing;
   e) encasing the inner arrangement provided with the first gas-tight casing and the first molding surface with a second gas-tight casing so as to provide an entire arrangement;
   applying a first negative pressure to the inner planar gas-conducting element and the inside of the first gas-tight casing;
   g) heating the entire arrangement for a first predetermined time at a first specified temperature;
   h) applying a second negative pressure to the inside of the second gas-tight casing via the at least one outer planar gas-conducting element; and
   i) heating the entire arrangement for a second predetermined time at a second specified temperature.

2. The method recited in claim 1, further comprising, after step b):
   b') arranging at least one inner gas-conducting structure on an outside of at least one surface region of the inner planar gas-conducting element, and
   wherein step f) further comprises applying the first negative pressure to the inner planar gas-conducting element via the at least one inner gas-conducting structure.

3. The method recited in claim 2, wherein the at least one inner gas-conducting structure is arranged on a lateral edge of the inner planar gas-conducting element.

4. The method recited in claim 1, further comprising, before step c), arranging a second molding surface on a side of the inner arrangement remote from the first molding surface.

5. The method recited in claim 1, wherein steps b) and c) are combined by using a sheet material that is previously provided with a first gas-tight casing.

6. A device for producing a composite molded part from fiber-reinforced plastics material, the device comprising:
   a first molding tool including a molding surface;
   an inner arrangement of a prepreg semi-finished product, including fibers which are pre-impregnated with a matrix material and are configured to be placed on the molding surface, and a sheet material encasing the prepreg semi-finished product, the sheet material including a gas-permeable membrane configured to hold back the matrix material, and at least one inner planar gas-conducting element, the inner arrangement being enclosed by a first gas-tight casing;
   a first negative pressure source that is operatively connected to an inside of the first gas-tight casing;
   a second gas-tight casing enclosing the inner arrangement that is provided with the first gas-tight casing and the molding surface of the molding tool;
   a second negative pressure source that is operatively connected to the inside of the second casing;
   a heater enclosing the entire arrangement at least in part; and
   at least one outer planar gas-conducting element that is in fluid connection with the second negative pressure source, the at least one outer planar gas-conducting element being disposed on an outside of at least one surface region of the first gas-tight casing.

7. The device recited in claim 6 further comprising at least one inner gas-conducting structure in fluid connection with the inner planar gas-conducting element and with the first negative pressure source that is disposed on an outside of at least one surface region of the inner planar gas-conducting element.

8. The device recited in claim 7, wherein the at least one inner gas-conducting structure is disposed on lateral edges of the inner planar gas-conducting element.

9. The device recited in claim 6, further comprising a second molding tool with a molding surface disposed on a side of the inner arrangement that is remote from the first molding tool.

10. The device recited in claim 6, wherein the sheet material is connected, on an outside thereof remote from the membrane, to a gas-tight casing.

* * * * *